United States Patent [19]

Usui et al.

[11] Patent Number: 4,723,443
[45] Date of Patent: Feb. 9, 1988

[54] INTAKE AIR FLOW SENSOR

[75] Inventors: Toshifumi Usui, Katsuta; Shozo Yanagisawa, Toykai; Tadao Osawa, Katsuta, all of Japan

[73] Assignee: Hitachi, Ltd., Tokyo, Japan

[21] Appl. No.: 913,241

[22] Filed: Sep. 30, 1986

[30] Foreign Application Priority Data

Oct. 4, 1985 [JP] Japan ................. 60-220105

[51] Int. Cl.⁴ .......................... G01M 15/00
[52] U.S. Cl. .................. 73/118.2; 73/204
[58] Field of Search ........... 73/118.2, 204; 123/494

[56] References Cited

U.S. PATENT DOCUMENTS 4,624,134 11/1986 Nagano .................. 73/118.2

FOREIGN PATENT DOCUMENTS 162413 9/1984 Japan .

Primary Examiner—Jerry W. Myracle
Attorney, Agent, or Firm—Antonelli, Terry & Wands

[57] ABSTRACT

An intake air flow sensor comprises a sensor main body and a connection unit main body, the former consisting of a main passage for passing intake air and a bypass passage for bypassing part of the air flowing through the main passage and joining it again to the air of the main passage. An intake air flow meter is disposed in the bypass passage to measure the intake air quantity. The bypass passage has an opening which opens to the main passage. A ring is fitted into the main passage of the sensor main body in such a manner as to close part of the opening of the bypass passage. An insulator is clamped by the ring and the connection unit main body. According to this construction, the area of the opening of the bypass passage to the main passage is not changed due to deformation of an insulator when the insulator is interposed between the sensor main body and the connection main body and they are fixed together by bolts.

3 Claims, 3 Drawing Figures

INTAKE AIR FLOW SENSOR

BACKGROUND OF THE INVENTION

1. Field of the Invention

This invention relates to an intake air flow sensor for measuring the quantity of air sucked by an internal combustion engine.

2. Description of the Prior Art

Intake air flow sensors using a heat ray flow velocity meter are generally known well in the art and put into practical use as disclosed, for example, in Japanese Patent Laid-Open No. 162413/1984 laid-open on Sept. 13, 1984.

In the intake air flow sensor described above, an insulator for heat insulation is interposed between a sensor main body where a heat ray sensor is disposed in practice and a connection unit main body which is disposed downstream of the sensor main body.

In this case, the insulator defines part of the outlet of a bypass passage.

In the conventional intake flow sensor described above, however, an opening of a bypass passage to a main passage is formed between the sensor main body and the insulator in order to guide the air flowing through the bypass passage into the main passage and moreover, the sensor main body and the connection unit main body are integrated with each other by pressure-caulking or bolt fixing. Accordingly, the opening to the main passage is not compressed but is closed by the insulator so that the area of the opening of the bypass passage to the main passage changes.

The change in the area of the opening in turn changes the output characteristics of the intake air flow sensor disposed in the bypass passage when the intake air flow sensor is taken into consideration as a whole.

SUMMARY OF THE INVENTION

The present invention is directed to prevent the change of the opening of the bypass due to the insulator.

In accordance with the present invention, a ring is disposed in such a manner as to close part of the opening of the bypass passage to the sensor main body and to clamp the insulator in cooperation with the connection unit main body.

In accordance with the present invention, further, part of the outlet is formed by the ring and the insulator is clamped by the ring and the connection unit main body so that the area of the opening is not changed by the insulator.

DESCRIPTION OF THE PREFERRED EMBODIMENTS

Figure 3:
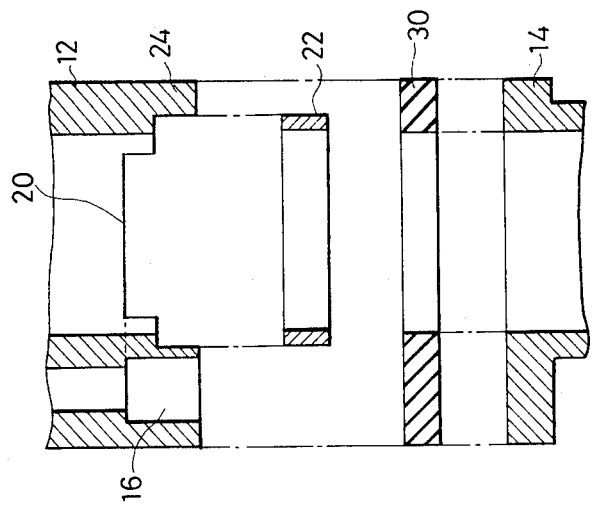
FIG. 3 is a sectional view of principal portions of FIG. 1 and shows the section of each component before assembly.
Figure 1:
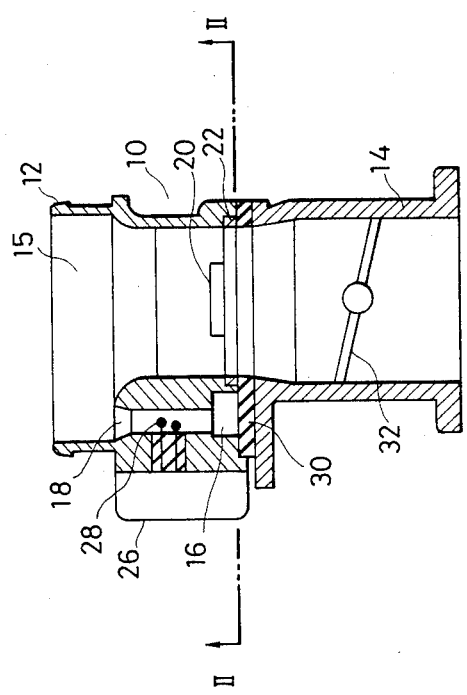
FIG. 1 is a sectional view of an intake air flow sensor in accordance with one embodiment of the present invention.
Figure 2:
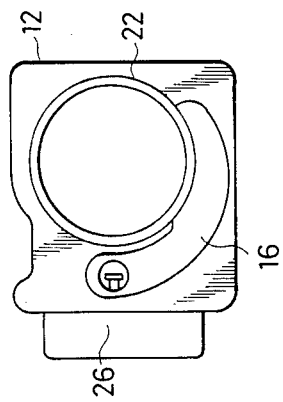
FIG. 2 is a plan view taken along line II—II in FIG. 1.

In FIGS. 1 through 3, reference numeral 10 represents an intake air flow sensor, which consists of a sensor main body 12 and a connection unit main body 14.

The sensor main body 12 has a main passage 15 and a bypass passage 16 formed therein, and the bypass passage 16 has a bell mouth-like inlet 18 and a rectangular opening or outlet 20.

As can be seen from FIG. 3, the outlet 20 is formed in such a manner that its three sides are positioned on the sensor main body 12 in the step form, and its remaining one side is formed by a ring 22. In other words, the outlet 20 is formed when the ring 22 is pushed into a storage hole 24 of the sensor main body 12.

A sensor portion 28 of a heat ray flow meter 26 is exposed at an intermediate portion of the bypass passage 16.

An insulator 30 for heat insulation is interposed between the sensor main body 12, the ring 22 and the connection unit main body 14.

A throttle valve 32 is disposed inside the connection unit main body 14 to controls the air quantity.

The air quantity flowing through the connection unit main body 14 can be determined by measuring the quantity of the air flowing through the bypass passage 16 by the heat ray flow velocity meter 26.

In the construction described above, the outlet 20 is formed by the sensor main body 12 and the ring 22 and the insulator 30 is clamped by the ring 22 and the connection unit main body 14 so that the area of the outlet 20 is not affected adversely by the insulator 30.

In accordance with the present invention, the outlet of the bypass passage is formed by the sensor main body and the ring and the insulator is interposed between the ring and the connection unit main body, so that the outlet of the bypass passage is not affected by the insulator and the outlet area does not change.

Since the bypass passage is bypassed from the bell mouth-like inlet 18 in such a manner as to encompass the main passage up to the opening 20 of the main passage, pulsation of the air flow quantity can be prevented and the measuring accuracy of the intake air can be improved.

Furthermore, the intake air system can be made compact by disposing the throttle valve 32 in the connection unit main body 14.

What is claimed is:

1. In an intake air flow sensor comprising:
   a sensor main body consisting of a main passage for passing intake air and a bypass passage for bypassing part of the air to be passed through said main passage and then joining it to the air of said main passage;
   an intake air flow meter for measuring the quantity of air flowing through said bypass passage; and
   a connection unit main body connected between said sensor main body and an engine;
   the improvement wherein:
   (a) said sensor main body has a step portion disposed in such a manner as to face the connection surface to said connection unit main body and said main passage;
   (b) a ring is fitted into said step portion;
   (c) said sensor main body has an opening which is to introduce the air flowing through said bypass passage into said main passage and is disposed on the inner peripheral surface of said bypass passage in the proximity of said ring fitted into said step portion of said main passage; and
   (d) an insulator is interposed between said sensor main body including said ring and said connection unit main body.

2. An intake air flow sensor as defined in claim 1 wherein said bypass passage is formed in such a manner as to encompass said main passage and to reach said opening.

3. An intake air flow sensor as defined in claim 1 wherein said connection unit main body is equipped with a throttle valve for controlling the quantity of the air flowing through said connection unit main body.

* * * * *